United States Patent [19]
Lang et al.

[11] Patent Number: 5,110,196
[45] Date of Patent: May 5, 1992

[54] MOTOR-POWERED ADJUSTABLE REAR VIEW MIRROR

[75] Inventors: Heinrich Lang, Ergersheim; Wolfgang Seiboth, Bad Windsheim, both of Fed. Rep. of Germany

[73] Assignee: Mekra Rangau Plastics GmbH & Co. KG, Fed. Rep. of Germany

[21] Appl. No.: 351,808

[22] Filed: May 15, 1989

[30] Foreign Application Priority Data

May 20, 1988 [DE] Fed. Rep. of Germany ....... 3817288

[51] Int. Cl.$^5$ .............................. G02B 7/18; B60R 1/06
[52] U.S. Cl. ................................ 359/874; 248/481; 248/483; 248/487; 359/876; 359/877
[58] Field of Search ............... 350/637, 632, 633, 634, 350/636, 606; 248/481, 483, 487

[56] References Cited

U.S. PATENT DOCUMENTS

| | | |
|---|---|---|
| 3,575,496 | 9/1977 | Pollock et al. |
| 4,050,776 | 4/1971 | Hsu |
| 4,105,301 | 8/1978 | Doeg ................................. 350/637 |
| 4,190,326 | 2/1980 | Brodbeck ........................... 350/636 |

FOREIGN PATENT DOCUMENTS

| | | |
|---|---|---|
| 0017750 | 10/1980 | European Pat. Off. |
| 0090909 | 10/1983 | European Pat. Off. |
| 2822681 | 10/1981 | Fed. Rep. of Germany |
| 3120627 | 12/1982 | Fed. Rep. of Germany |
| 8531670 | 2/1986 | Fed. Rep. of Germany |
| 0022244 | 2/1977 | Japan ................................. 350/637 |
| 0148740 | 8/1985 | Japan ................................. 350/637 |
| 0268541 | 11/1986 | Japan ................................. 350/637 |
| 62-152942 | 7/1987 | Japan |
| 62-173348 | 7/1987 | Japan |

Primary Examiner—Bruce Y. Arnold
Assistant Examiner—R. D. Shafer
Attorney, Agent, or Firm—Laff, Whitesel, Conte & Saret

[57] ABSTRACT

A motor-powered adjustable rear view mirror for motor vehicles, particularly lorries, comprises a housing which supports and accommodates a mirror glass. Positioning drives are provided by means of which the housing can be pivoted and adjusted about two pivot axes which extend substantially at right angles to each other. In order to make the mirror of the simplest possible construction and so that it can be easily assembled and has a shallow but very stable design, each positioning drive is stationary in relation to the housing and is coupled via a slider-crank transmission to a base plate, the slider-crank transmission comprising a crank and a push rod connected thereto via a crank joint. The push rod is coupled to the base plate via a sliding bearing.

11 Claims, 8 Drawing Sheets

MOTOR-POWERED ADJUSTABLE REAR VIEW MIRROR

FIELD OF THE INVENTION

The invention relates to a motor-powered adjustable rear view mirror for motor vehicles, particularly lorries, comprising a housing accommodating and supporting a mirror glass and comprising a fixing device adapted to be rigidly connected to a motor vehicle and having a base plate which is stationary in relation to the fixing means and with, disposed between the base plate and the housing, a servo-motor arrangement comprising at least one positioning drive with positioning elements by means of which the housing can be adjusted by pivoting about at least one pivot axis.

BACKGROUND OF THE INVENTION

In the case of such a rear view mirror, disclosed by German published examined patent application 28 22 681 (corresponding to French published patent application 24 26 590 and Swedish published patent application 79 04 338), positioning drives are mounted on a base plate which is rigidly connected to the fixing device. The positioning element of one positioning drive directly engages the housing and pivots the housing about a transverse axis of a universal joint disposed between the housing and the base plate. The other positioning drive engages the universal joint and thus pivots the housing about its longitudinal axis. This prior art mirror is structurally cumbersome so that fitting it is very expensive. Furthermore, the depth of fitment of the servo-motor arrangement is relatively considerable so that the housing in turn becomes so deep that the driver's field of view in an obliquely forward direction is considerably restricted, which is a disadvantage when manoeuvring, where a very precise utilization of space is important.

In order to resolve this last mentioned problem, it is already known from European published patent application 0 090 909 for the servo-motor arrangement of motor-powered adjustable rear view mirrors to be connected directly to the fixing device. This known development does not however result in a sufficiently stable connection between housing and fixing device, particularly in the case of large rear view mirrors.

Known from German published patent application 31 20 627 is a motor-powered adjustable rear view mirror the housing of which is rigidly connected to a fixing device. A sheet of mirror glass connected to a supporting plate is connected to the housing and can be pivoted via a universal joint so that it is therefore pivoted in relation to the housing. Mounted on the housing are two positioning drives which are connected to the mirror glass via crank transmissions. This construction is of considerable depth, since the positioning drives are spatially disposed between the mirror glass and the rear wall of the housing and since furthermore space is required for the crank transmissions. Furthermore, this development is based on an essential prerequisite that the sheet of mirror glass is not rigidly connected to the housing, so that moisture and dirt can penetrate the assembly.

SUMMARY OF THE INVENTION

It is an object of the invention to develop a rear view mirror of the generic type so that it is of the simplest possible construction, is easily assembled and fitted and is of a shallow and very stable design.

According to the invention, this problem is resolved in that at least one positioning drive is stationary in relation to the housing and is coupled to the base plate via a slider-crank transmission, the latter comprising a crank coupled to the base plate via a sliding bearing. The design according to the invention makes for an extremely shallow construction. By reason of the at least one slider-crank transmission, the forces required for pivoting the housing with the mirror glass in relation to the fixing device are transmitted to the base plate transversely to the longitudinal direction of the slider-crank transmission. According to a first advantageous development of the slider-crank transmission, it is envisaged that there is articulated on the crank by means of a crank joint a push rod which is displaceably guided in a bearing sleeve which is connected to the base plate.

A further advantageous development of the slider-crank transmission provides for the crank to be coupled by a crank arm to a bearing block connected to the base plate and via an elongated hole connection which serves as a sliding bearing.

A further likewise particularly advantageous development of the slider-crank transmission envisages the crank being connected by a toggle lever to a bearing mounted on the base plate and serving as a sliding bearing.

If in accordance with a further advantageous development, it is envisaged that the slider-crank transmission be in itself pivotable about a longitudinal axis of the sliding bearing, then it is ensured that on the one hand inaccuracies in fitment of the positioning drives and the slider-crank transmissions are unimportant. Furthermore, it is also ensured that when using two positioning drives, each slider-crank transmission can accommodate the pivoting movements generated by which ever is the other positioning drive.

It is quite particularly advantageous for the housing to be pivotable about a central point about a universal joint which is connected to the fixing device. This development permits of a further advantageous embodiment whereby the pivoting axis associated with each positioning drive passes through the central point of the universal joint. This ensures that an extremely flat or shallow construction is achieved. This is also achieved in that each positioning drive is mounted directly on the housing.

In principle it is possible to provide only one positioning drive; it is however particularly advantageous to provide two positioning drives.

In this respect, it can on the one hand be particularly advantageous if both positioning drives are coupled to the base plate in each case via a slider-crank transmission. On the other hand, it can however also be expedient for one positioning drive to be coupled to the base plate via a slider-crank transmission while the other positioning drive is coupled to the base plate via a geared transmission.

Further advantages and features of the invention will become apparent from the ensuing description of some exemplary embodiments taken in conjunction with the drawings.

DESCRIPTION OF SOME PREFERRED EMBODIMENTS

Figure 1:
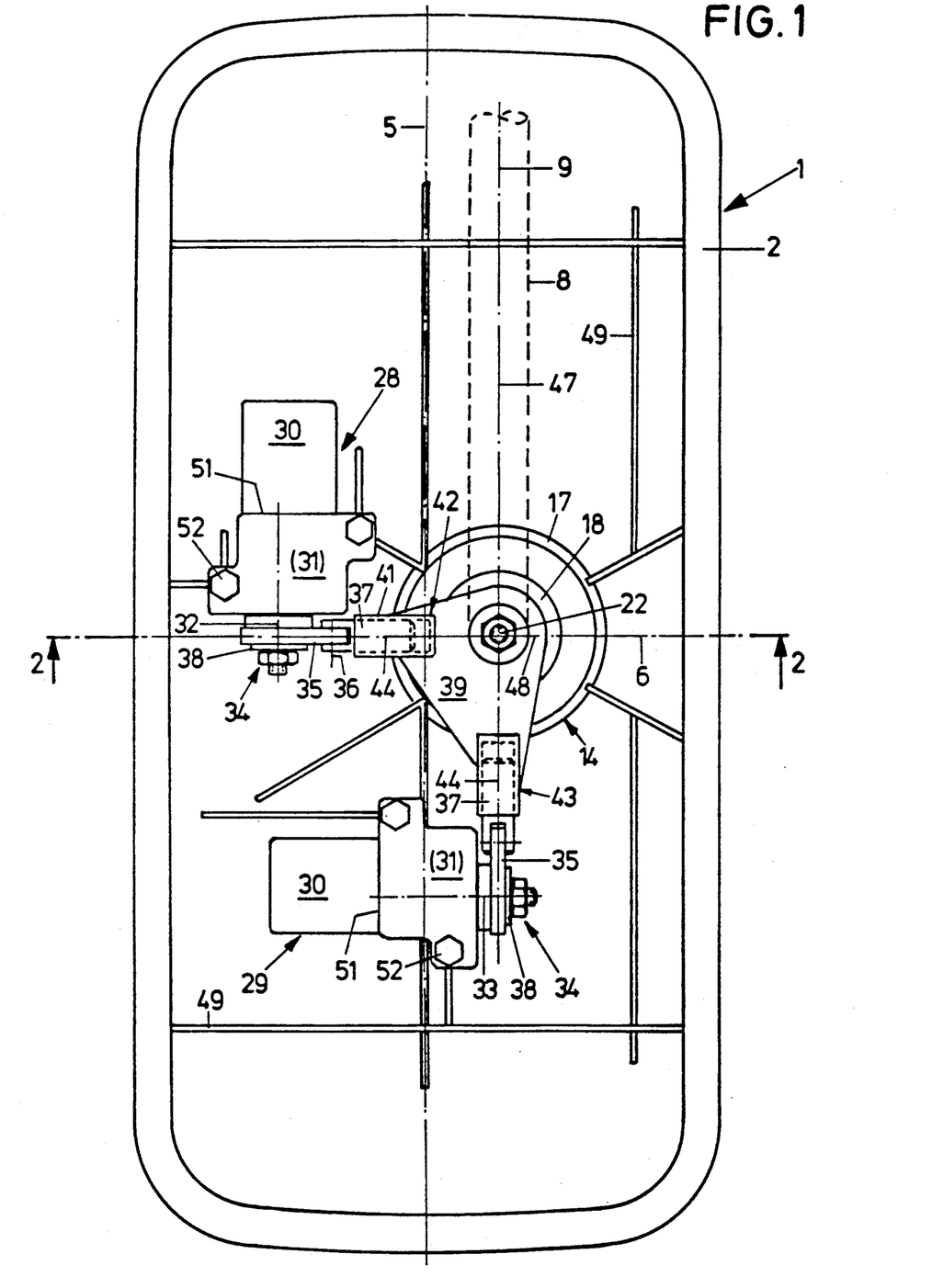
FIG. 1 shows a first embodiment of a rear view mirror according to the invention in plan view with the mirror glass removed.
Figure 2:
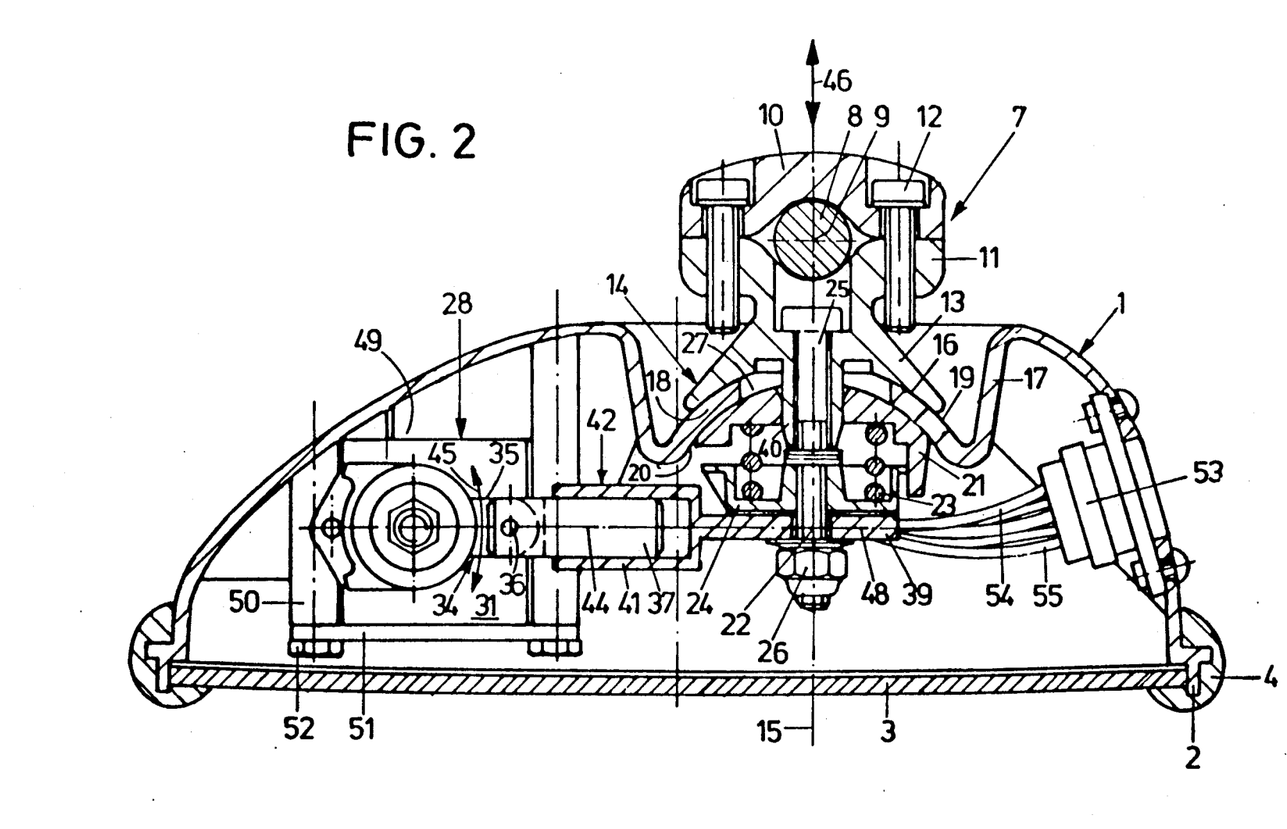
FIG. 2 is a cross-section through the rear view mirror taken on the line II—II in FIG. 1.

The rear view mirror shown in FIGS. 1 and 2 and intended for lorries comprises a housing 1 with a glass holder 2 in which a convexly curved sheet 3 of mirror glass is interchangeably held by a retaining ring 4. The frame-like glass holder 2 the defines the greatest cross-sectional area of the housing 1—outwardly open when the mirror glass 3 is removed. The glass holder 2 is—according to the cross-sectional area of the glass 3—of substantially rectangular construction. The area bounded by it has two axes of symmetry 5, 6 which extend at right-angles to each other, one axis of symmetry 5 being markedly longer than the axis of symmetry 6. In practice, the axis of symmetry 5 is about twice as long as the axis of symmetry 6.

The rear view mirror comprises a fixing device 7 resembling a tripod clamp, by means of which a clamping attachment on a bar 8 of a fixing bracket is feasible. Such an L- or C-shaped fixing bracket is mounted at the side of the driver's cabin of a lorry, as is generally conventional in practice. The bar 8 is in this case substantially vertical, its axis 9 extending substantially parallel with the long axis of symmetry 5. The fixing device 7 has, bearing on the bar 8, two clamping jaws 10, 11 which are held together by screws 12 and clamp the bar 8 between them. When the screws 12 are slackened, the view rear mirror can be displaced on the bar 8 in the direction of the axis 9 and pivoted about the bar 8. One clamping jaw 11 is constructed in one piece with a bearing member 13 of a universal joint 14 which is constructed in the fashion of a spherical bearing. A concave spherical bearing shell 16 is constructed on this bearing member 13, symmetrically in relation to its central axis 15.

Around the bearing member 13, the housing 1 is provided with a depression, i.e. it comprises, directed into the interior of the housing 1, a substantially frustoconical wall zone 17 on the bottom of which there is constructed a bearing member 18 having two mutually parallel bearing surfaces 19, 20. The outer bearing surface 19 of these two bearing surfaces 19, 20 bears against the bearing shell 16. A spherical bearing cover 21 in turn bears against the inner bearing surface 20. The bearing surfaces 19, 20 and the bearing shell 16 and the bearing cover 21 have a common spherical centre 22 which lies on the central axis 15. The bearing cover 21 is pressed by a pretensioned coil thrust spring 23 against the bearing member 18 and thus against the bearing shell 16 so that the bearing member 18 with its bearing surfaces 19, 20 is supported by a predetermined frictional force between the bearing shell 16 and the bearing cover 21. That side of the thrust spring 23 which is directed away from the bearing cover 21 is biased against a cover-like abutment 24. The assembly comprising bearing member 13 with bearing shell 16, bearing member 18, bearing cover 21, thrust spring 23 and abutment 24 is held together by a screw-threaded bolt 25 aligned with the central axis 15 and a screw-threaded nut 26 which is screwed onto it. Screwing on the screw-threaded nut 26 adjusts the initial tension of the thrust spring 23 and so the frictional force with which the bearing member 18 and thus the housing 1 is supported in the universal joint 14. When this frictional force is exceeded, then the housing 1 with the mirror glass 3 is pivoted about the central point 22 in relation to the fixing device 2. This pivotability which is provided on grounds of safety, is made possible and is defined by a central aperture 27 in the nearing member 18. In the embodiment which has been described thus far, the rear view mirror can be manually adjusted; it is therefore fully functional.

Mounted on the housing 1 are two positioning drives 28, 29 which are powered by electric motors, each consisting of an electric motor 30 and a reduction gearing 31 on the downstream side thereof. The output spindles 32, 33 of these two positioning drives 28, 29 are at right-angles to each other, one output spindle 32 or 33 extending parallel with one of the axes of symmetry 5 or 6. Mounted on the relevant output spindle 32, 33 of each positioning drive 28, 29 is a slider-crank transmission 34 which consists of a crank 35 driven by the relevant output spindle 32 or 33 and a push rod 37 connected to the crank 35 via a crank joint 36. The relevant slider-crank transmission 34, i.e. specifically the crank 35, is connected to the respective output spindle 32 or 33 via a slipper coupling 38 which is only roughly indicated in FIG. 1. Fixed on the universal joint 14 of the fixing device 7 is a base plate 39 constructed in the manner of an angled lever and which is biased by means of the threaded bolt 25 with the screw-threaded nut 26 against the bearing member 13 via a spacing sleeve 40. Also the cover-like abutment 24 is biased against this spacer sleeve 40. The base plate 39 is thus rigidly connected to the fixing device 7.

The base plate 39 comprises two cylindrical bearing sleeves 41 engaged by the likewise cylindrically constructed push rods 37 of the slider-crank transmissions 34 of the two positioning drives 28, 29. Consequently, sliding bearings 42, 43 are formed in which forces acting in the direction of the relevant axis 44 of the corresponding push rod 37 cannot be transmitted whereas forces acting at right-angles thereto can be transmitted by the slider-crank transmissions 34 to the base plate 39. Upon pivoting movements of the relevant crank joint 36 substantially at right-angles to the relevant axis 44, i.e. substantially parallel with the central axis 15, corresponding to the arrows 45, 46 which indicate the direction of the pivoting movement, the housing 1 is pivoted in relation to the fixing device 7. When this happens, the bearing member 18 with its two bearing surfaces 19, 20, overcoming the above-mentioned frictional force, is shifted between the bearing shell 16 and the bearing cover 21. The pivoting movements of the housing 1 take place about two pivot axes 47, 48 which pass through the central point 22 of the sphere and which are at right-angles to each other, in fact the pivoting action takes place about the axis 47 when the positioning drive 28 is actuated and about the pivoting axis 48 when the positioning drive 29 is actuated. The pivoting axis 47 extends parallel with the output spindle 32 while the pivoting axis 48 extends parallel with the output spindle 33.

Since the relevant push rod 37 and the associated bearing sleeve 41 are of cylindrical construction, it is ensured that the orientation of the respective positioning drive 28, 29 in respect of the base plate 39 does not need to be very exact, since errors in alignment can be compensated by the rotatability of the relevant push rod 37 about its axis 44 in relation to the bearing sleeve 41 and thus in relation to the base plate 39.

For fixing the positioning drives 28, 29, there are in the housing 1 supports which are formed by ribs 49. On both sides of the relevant reduction gearing 31 there are constructed in the housing 1 sleeves 50 on which screws 52 support a retaining plate 51 which rests on the reduction gearing 31 so that the positioning drives 28, 29 can easily be secured by a clamping action. With this assembly, it is possible also for these latter to be aligned. Since the housing 1 with the ribs 49 and the sleeves 50 consist of a synthetic plastics material, an accurately-shaped production presents no problem and can be carried out in a conventional manner. Since the bearing member 13 on the one hand and the bearing cover 21 on the other usually consist of metal while on the other hand—as just stated—also the bearing member 18 consists of synthetic plastics material, it is possible to set up very accurately definable friction and sliding relationships in the universal joint 14.

Provided in the housing 1 is a socket 53 from which electrical leads 54, 55 extend to the electric motors 30 of the two positioning drives 28, 29. The actuating switches for the positioning drives 28, 29 are disposed in the vehicle and are therefore not shown.

Figure 3:
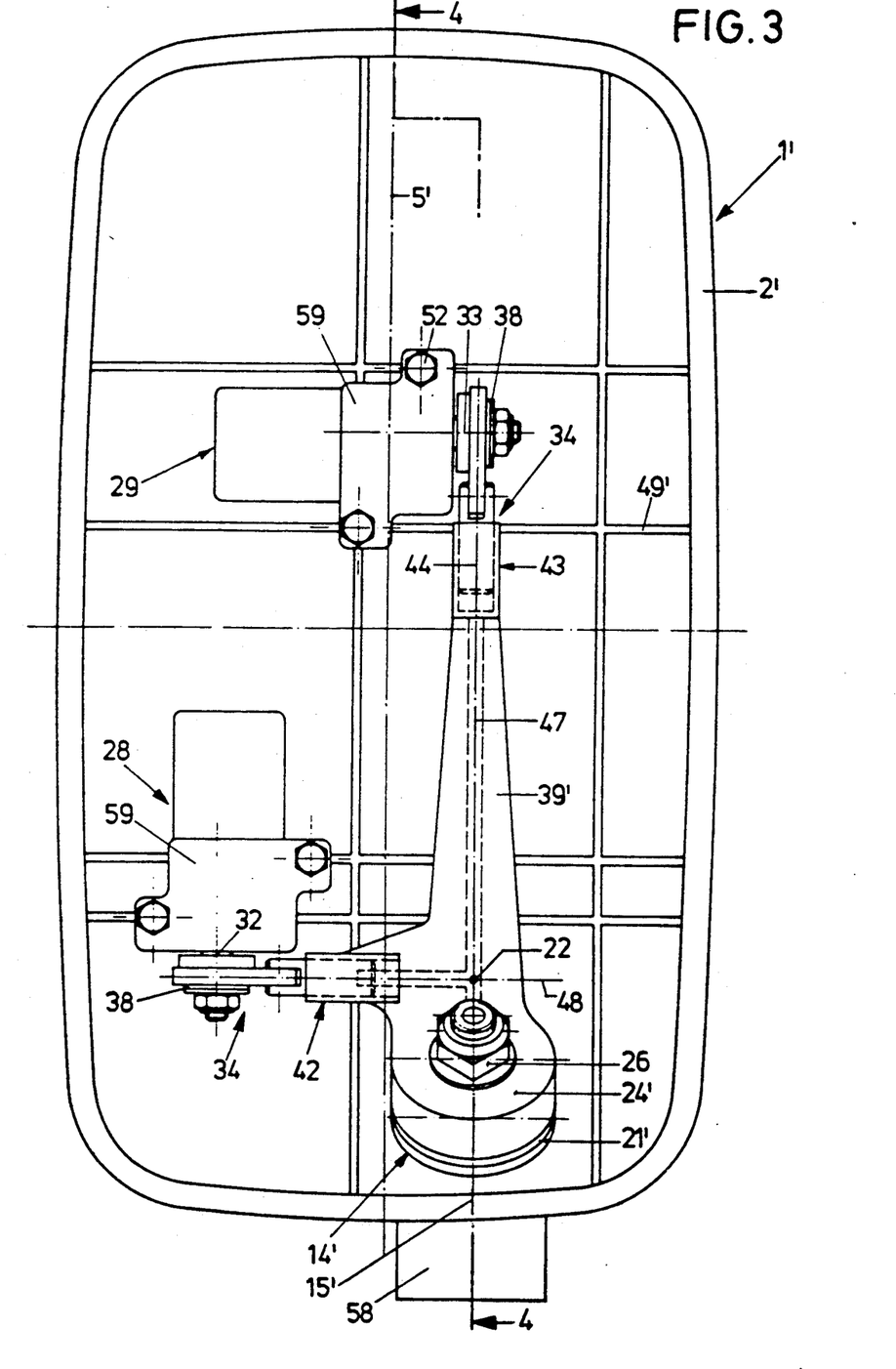
FIG. 3 shows a plan view of a second embodiment of a rear view mirror according to the invention, with the mirror glass removed.
Figure 4:
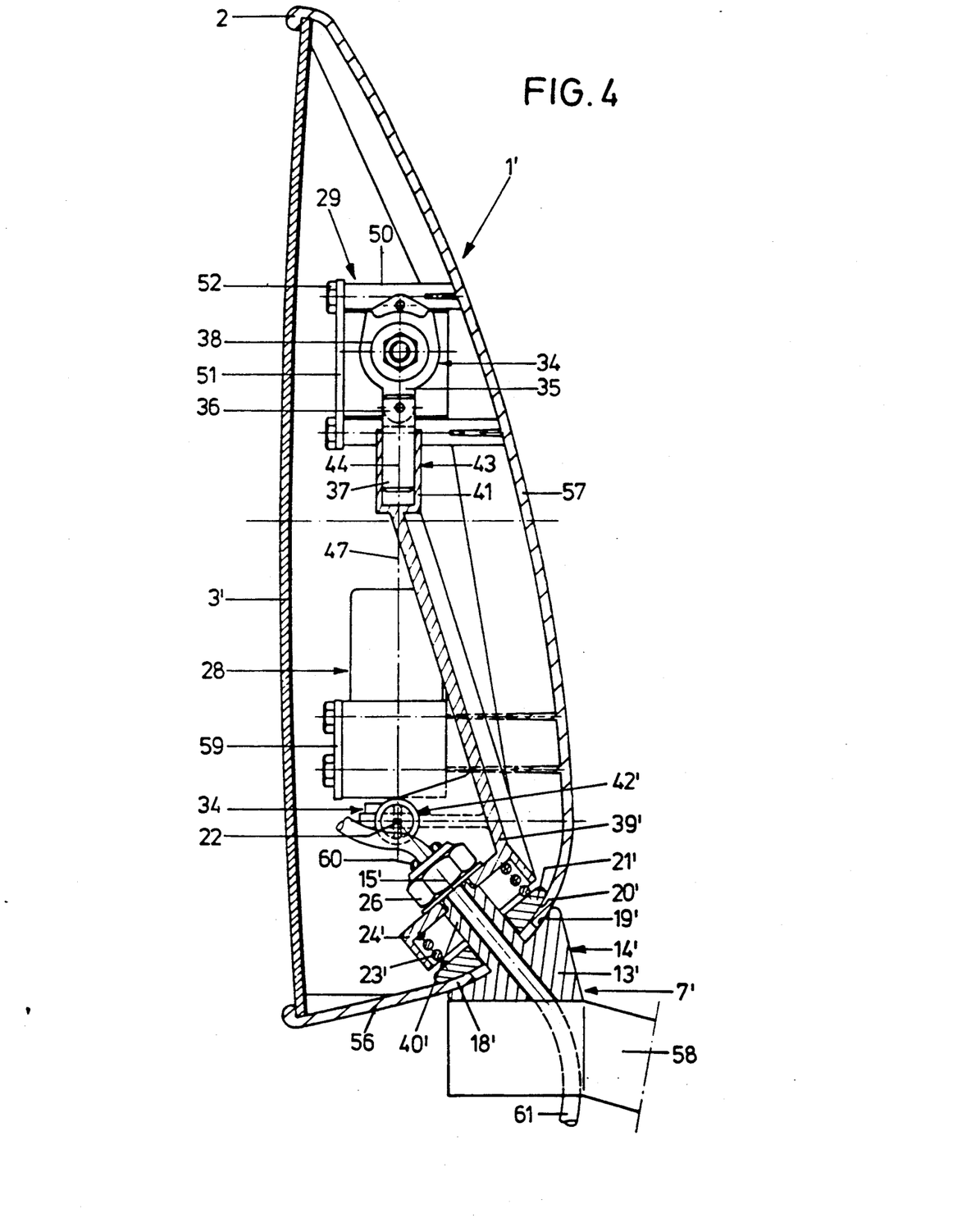
FIG. 4 shows a cross-section through the second embodiment, taken on the line IV—IV in FIG. 3.

The embodiment according to FIGS. 3 and 4 differs from that shown in FIGS. 1 and 2 essentially by reason of the disposition of a fixing device 7' and thus of the universal joint 14' in relation to the housing 1'. Since all the essential parts are identical or at least functionally identical to the corresponding parts of the embodiment shown in FIGS. 1 and 2, identical parts are identified by the same reference numerals while structurally modified but functionally identical parts are identified by the same reference numerals but with a prime, without in each case requiring a fresh description.

Where this embodiment is concerned, the housing 1' comprises a lower outer transverse wall 56 which is sharply and convexly curved in relation to the mirror glass 3' in the glass holder 2' and it has, extending upwardly therefrom, an outer transverse wall 57 which is more shallowly curved. At the transition between these two walls 56, 57 disposed in the lower area, the spherical bearing part 18' with the two bearing surfaces 19' and 20' is constructed directly in this area of the wall. The fixing device 7' may comprise a supporting arm 58 which leads directly to the lorry. Adjacent the universal joint 14' there is a positioning drive 28 while the other positioning drive 29 is disposed in the upper portion of the housing 1'. Accordingly, the construction of the angled lever-like base plate 39' is such that the sliding bearing 42 associated with the positioning drive 28 is disposed relatively close to the central axis 15' while the sliding bearing 43 associated with the positioning drive 29 is at a markedly greater distance from it.

The fixing device 7' does not comprise any threaded bolts; instead, there is constructed on the spacer sleeve 40' a threaded sleeve extension 60 which passes through the cover-like abutment 24' and the screw-threaded nut 26 is screwed onto it. This makes it possible to introduce into the housing 1' a power supply cable which passes through the spacer sleeve 40' to reach the positioning drives 28, 29.

Figure 5:
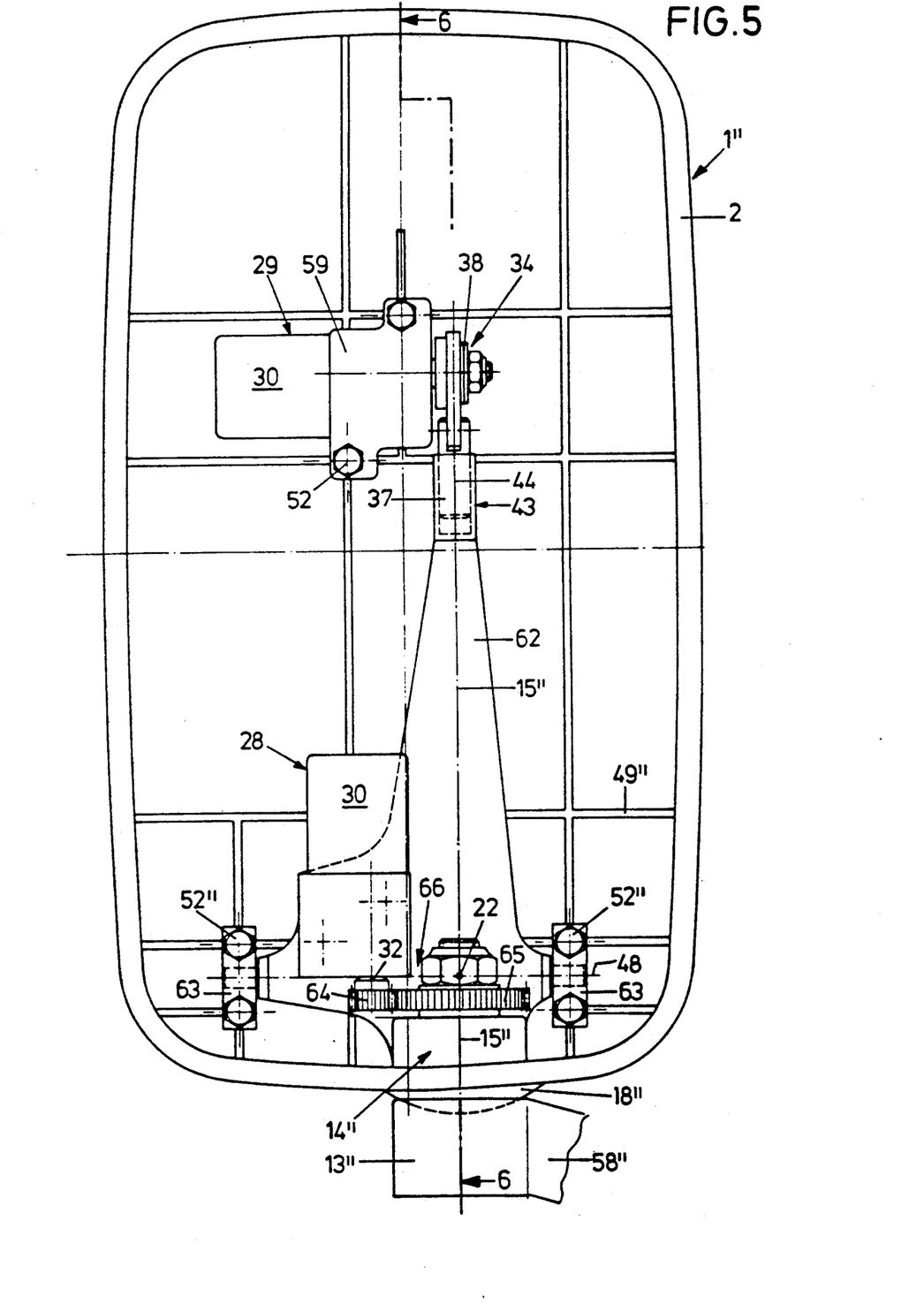
FIG. 5 is a plan view of a third embodiment of a rear view mirror according to the invention, with the mirror glass removed.
Figure 6:
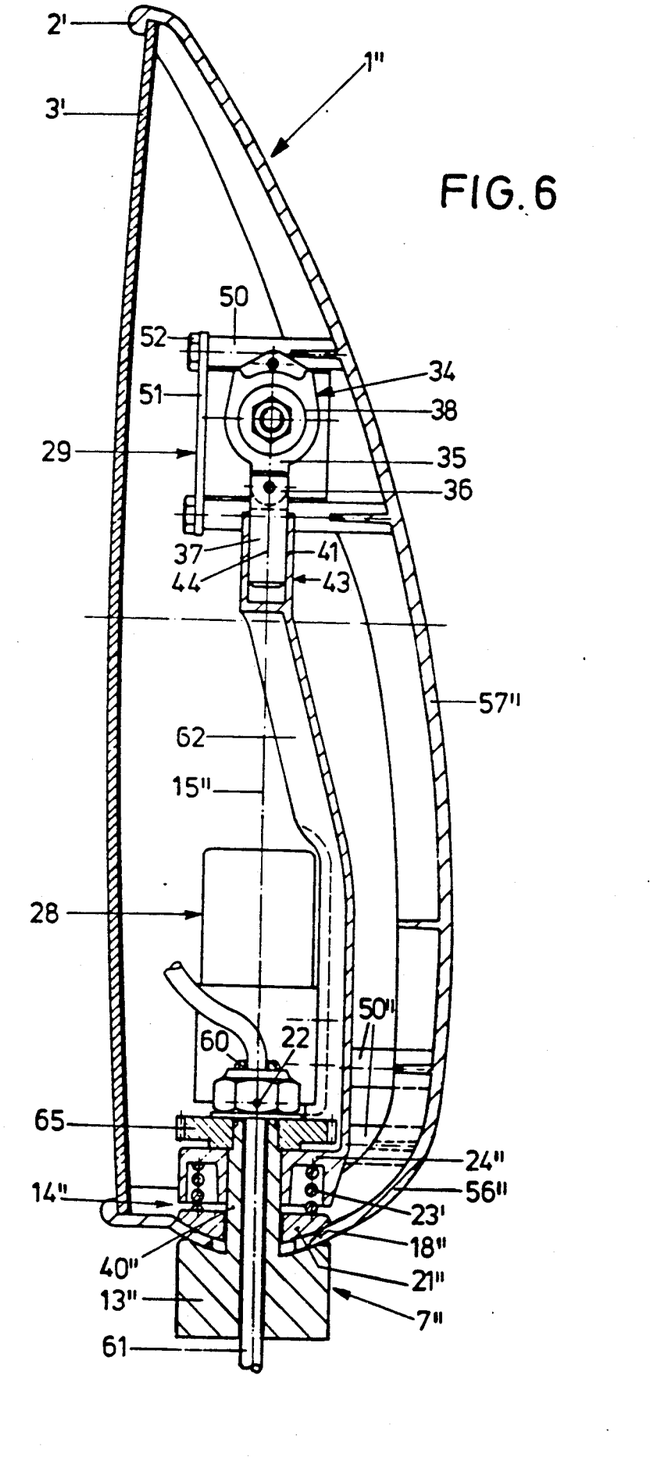
FIG. 6 is a cross-section through the third embodiment, taken on the line VI—VI in FIG. 5.

It is also true for the embodiments according to FIGS. 5 and 6 that parts identical to the previously described embodiments are identified by the same reference numerals while structurally different but functionally identical parts are identified by the same reference numeral but with the addition of a double prime. The lower outer transverse wall 56" has in this case the spherical bearing member 18". In this case, there is rigidly mounted on the universal joint 14" a base plate 62 resembling a simple lever engaged by a positioning drive 29 via a slider-crank transmission 34 and through a sliding bearing 43. The base plate 62 is rotatable about the central axis 15" which to this extent acts as a pivot axis 15". A positioning drive 28 is fixed on the housing 1" by means of a supporting plate 63 and screws 52", there being mounted on the output spindle 32 a pinion 64 which engages a gear wheel 65 which is rotationally rigidly connected to the spacer sleeve 40" and through it to the bearing member 13". The pinion 64 and the gear wheel 65 form a geared transmission 66. As a result of appropriately driving the positioning drive 28 about its output spindle 32 which is parallel with the central axis 15", the housing 1" is rotated about this central axis 15" and in relation to the support are arm 58". The pivoting movement at right-angles to this, in other words about a pivot axis which is horizontal in FIGS. 5 and 6, is effected by means of the positioning drive 29.

Figure 7:
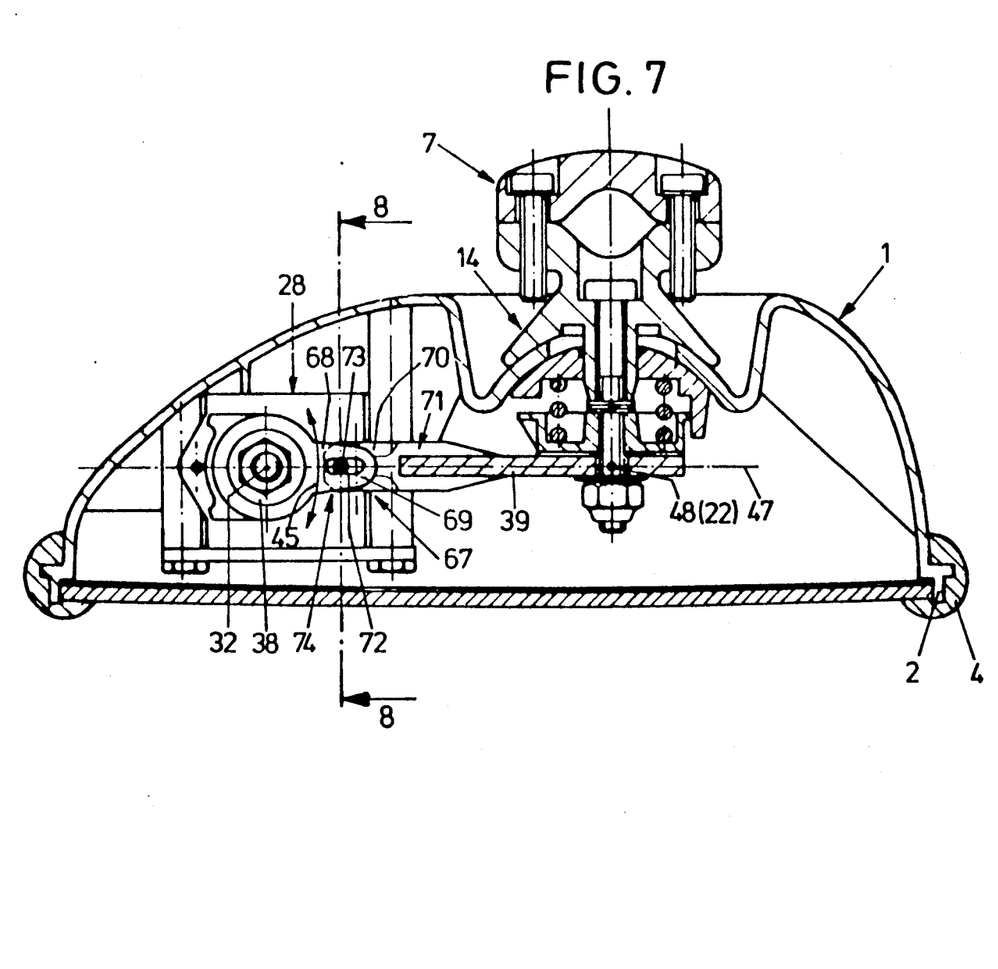
FIG. 7 is a cross-section through a fourth embodiment of a rear view mirror according to the invention.
Figure 8:
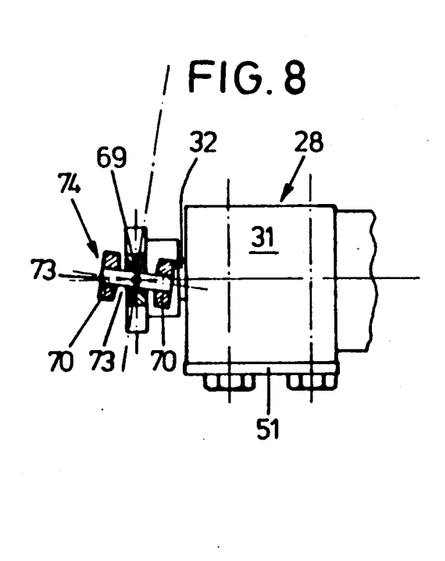
FIG. 8 is a partial view taken from FIG. 7 and on the line VIII—VIII in FIG. 7.

The example of embodiment shown in FIGS. 7 and 8 is substantially identical to that shown in FIGS. 1 and 2. The view in FIG. 7 corresponds to that in FIG. 2. The only difference between the two embodiments resides in the configuration of the slider-crank transmission. Therefore, only this latter needs to be described. Otherwise, the same reference numerals are used in the drawing as were used in FIGS. 1 and 2.

The slider-crank transmission 67 shown in FIGS. 7 and 8 comprises a crank 68 connected to the output spindle 32 of the positioning drive 28 via the slipper coupling 38. A crank arm 69 on the crank 68 engages between two webs 70 of a bearing member 71 which is rigidly connected to the base plate 39. The crank arm 69 comprises an elongated hole 72 through which passes a bolt 73 which is rigidly connected to the webs 70. Consequently, a sliding bearing 74 is formed. Upon a pivoting movement of the output spindle 32 and thus of the crank arm 69, according to the arrow 45 which indicates the direction of pivoting, the base plate 39 is pivoted in relation to the housing 1 and about the pivot axis 48. Elongated hole 72 and bolt 73 on the one hand and crank arm 69 and webs 70 on the other have so much clearance in respect of one another that they are also able to accommodate the pivoting movements about the pivot axis 47 which are exerted by the other pivot drive, not shown. This is indicated in FIG. 8.

Figure 9:
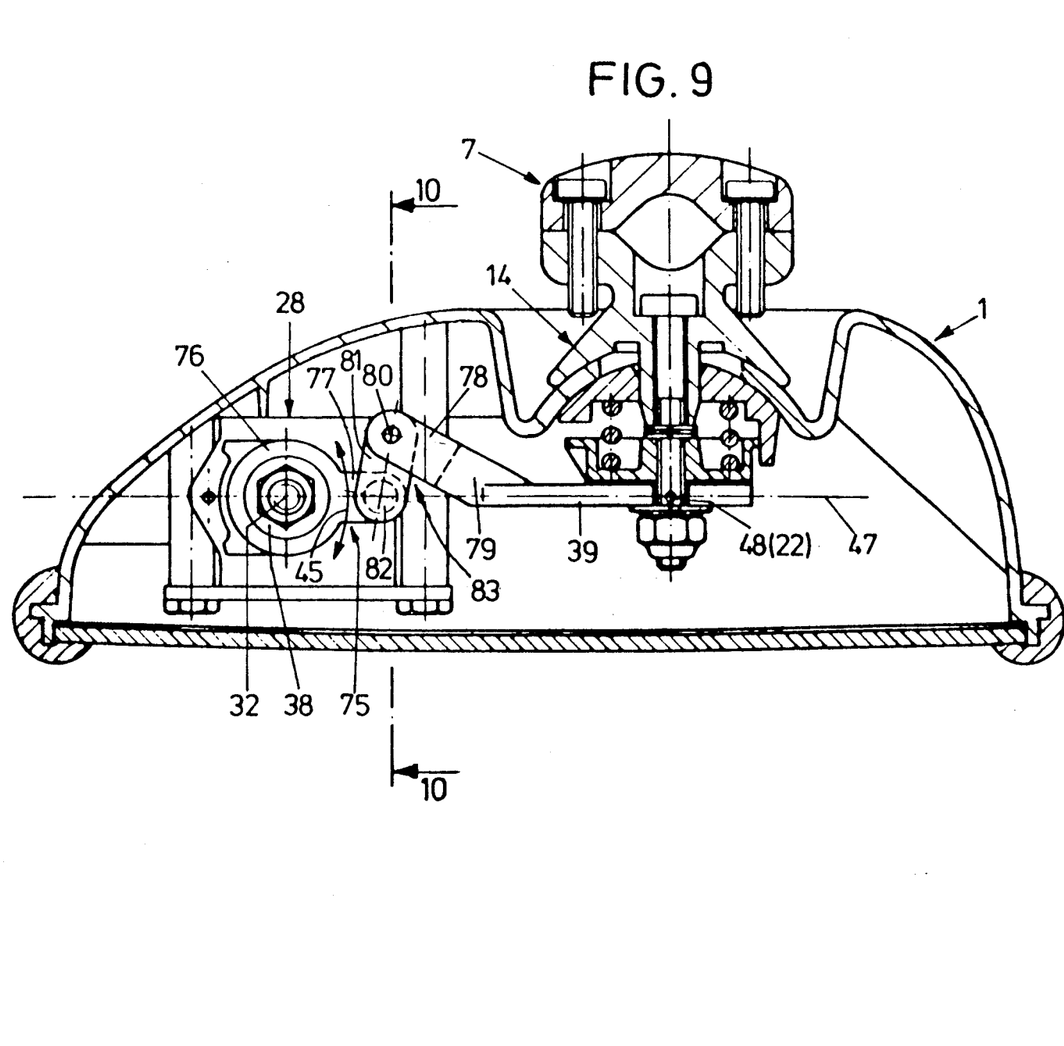
FIG. 9 shows a cross-sectional view of a fifth embodiment of a rear view mirror according to the invention and FIG. 10 is a partial view taken from FIG. 9 and on the line X—X in FIG. 9.
Figure 10:
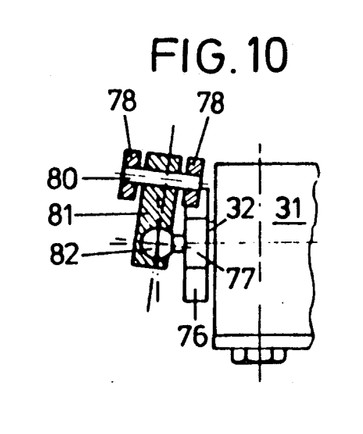

Also the embodiment shown in FIGS. 9 and 10 differs from the embodiment shown in FIGS. 1 and 2 only in the configuration of the slider-crank transmission. The views in FIGS. 9 and 10 otherwise correspond to those in FIGS. 7 and 8. Here, too, a slider-crank transmission 75 comprises a crank 76 connected to the upward spindle 32 of the positioning drive 28 via a slipper coupling 38, the crank 76 comprising a radially projecting crank arm 77. A bearing block 79 comprising two webs 78 is rigidly mounted on the base plate 39. Between these webs 78, a toggle lever 81 is articulated by means of a pivot joint 80 and is in turn connected to the crank arm 77 via a ball joint 82. The bearing block 79, the crank arm 77 and the doubly articulated toggle lever 81 between these two members form a sliding bearing 83 in the broadest sense of the word. Upon pivoting movements of the crank 76 corresponding to the arrow indicating to pivoting direction 45, so the base plate 39 is pivoted about the axis 48. The toggle lever 81 is connected by the ball joint 82 to the crank arm 77 in order to be able to accommodate pivoting movements of the base plate 39 about the pivot axis 47, such movements being triggered by the other positioning drive, not shown.

Also the other positioning drive, not shown here, comprises an identical slider-crank transmission.

What is claimed is:

1. A motor-powered adjustable rear view mirror for motor vehicles, comprising a housing (1, 1', 1'') accommodating and supporting a mirror glass (3, 3') a fixing device (7, 7', 7'') having means to be rigidly connected to a motor vehicle, a base plate connected in a stationary manner to the fixing means (7, 7' 7''), a universal joint (14, 14' 14'') which is connected to the fixing device (7, 7' 7'') and which bears the housing (1, 1', 1'') pivotally about a central point (22) of the universal joint (14, 14', 14'') and, at least one positioning drive (28, 29) connected in a stationary manner to the housing (1, 1', 1'') and is coupled to the base plate (39, 39', 62) via a slider-crank transmission (34, 67, 75), by means of which the housing (1, 1', 1'') is adjusted by pivoting about at least one pivot axis (47, 48) passing through said central point (22), wherein the slider-crank transmission (34, 67, 75) comprises a crank (35, 68, 76) coupled to the base plate (39, 39', 62) via a sliding bearing (42, 43, 74,83) and wherein there is articulated on the crank (35) by means of a crank joint (36) a push rod (37) which is displaceably guided in a bearing sleeve (41) which is connected to the base plate (39, 39') and wherein the slider-crank (35, 67, 75) is in itself pivotable about a longitudinal axis (44) of the sliding bearing (42, 43, 74, 83).

2. A rear view mirror according to claim 1, wherein the pivot axis (47, 48) associated with each positioning drive (28, 29) passes through the central point (22) of the universal joint (14, 14', 14'').

3. A rear-view mirror according to claim 2, wherein two positioning drives (28, 29) are provided, and wherein two pivot axes (47, 48) are directed rectangularly to each other.

4. A rear-view mirror according to claim 3, wherein the housing pivotable about one pivot axis (47, 48) by means of one positioning drive (28, 29).

5. A rear view mirror according to claim 1, wherein each positioning drive (28, 29) is mounted directly on the housing (1, 1', 1'').

6. A rear view mirror according to claim 1, wherein two positioning drives (28, 29) are provided.

7. A rear view mirror according to claim 6, wherein both positioning drives are in each case connected to the base plate (39, 39', 62) via a slider-crank transmission (34, 67, 75).

8. A rear view mirror according to claim 4, wherein the positioning drive (29) is coupled to the base plate (62) via a slider-crank transmission (34) and wherein the other positioning drive (28) is coupled to the base plate (62) via a geared transmission (66).

9. A rear view mirror according to claim 1, wherein constructed on the housing (1, 1', 1'') is a shell-like bearing member (18, 18', 18'') which has a spherical bearing surface (19, 19', 19'') by which it is pressed against a bearing shell (16, 16', 16'') of the universal joint (14, 14', 14'').

10. A rear view mirror according to claim 9, wherein the bearing member (18, 18', 18'') is pressed by an initially tensioned thrust spring (23, 23', 23'') resiliently against the bearing shell (16, 16', 16'').

11. A rear view mirror according to claim 9, wherein the bearing member (18, 18', 18'') with two spherical bearing surfaces (19, 19', 19'', 20, 20', 20'') is disposed between the bearing shell (16, 16', 16'') and a spherical bearing cover (21, 21', 21'').

* * * * *